(12) United States Patent
Kizler et al.

(10) Patent No.: US 12,466,339 B2
(45) Date of Patent: Nov. 11, 2025

(54) PARTITION

(71) Applicant: Henkel AG & Co. KGaA, Düsseldorf (DE)

(72) Inventors: Tobias Kizler, Sandhausen (DE); Georg Manuel Siegel, Neckarsteinach (DE); Stefan Kochert, Reilingen (DE); Dario Miguel Santinho Ferreira, Wiesenbach (DE); Jochen Becker, Angelbachtal (DE); Ralph Dalhaeuser, Viernheim (DE)

(73) Assignee: HENKEL AG & CO. KGaA, Duesseldorf (DE)

( * ) Notice: Subject to any disclaimer, the term of this patent is extended or adjusted under 35 U.S.C. 154(b) by 387 days.

(21) Appl. No.: 18/172,635

(22) Filed: Feb. 22, 2023

(65) Prior Publication Data
US 2023/0202407 A1 Jun. 29, 2023

Related U.S. Application Data

(63) Continuation of application No. PCT/EP2021/073629, filed on Aug. 26, 2021.

(30) Foreign Application Priority Data

Aug. 28, 2020 (EP) .................................... 20193282

(51) Int. Cl.
*B60R 13/08* (2006.01)
*B62D 25/00* (2006.01)
*B62D 29/00* (2006.01)

(52) U.S. Cl.
CPC .......... *B60R 13/0823* (2013.01); *B62D 25/00* (2013.01); *B62D 29/002* (2013.01)

(58) Field of Classification Search
CPC .... B62D 29/002; B60R 13/04; B60R 13/0807
See application file for complete search history.

(56) References Cited

U.S. PATENT DOCUMENTS 5,506,025 A * 4/1996 Otto .................. B29C 44/188
428/476.3
5,631,027 A 5/1997 Takabatake
(Continued)

FOREIGN PATENT DOCUMENTS

CN 1531489 A 9/2004
DE 29522122 U1 11/1999
(Continued)

OTHER PUBLICATIONS

PCT International Search Report—WO PCT/EP2021/073629—Completed: Nov. 8, 2021 Mailing date: Nov. 17, 2021—No. of pp. 4.

*Primary Examiner* — Gregory A Blankenship
(74) *Attorney, Agent, or Firm* — Sun Hee Thomas (57) ABSTRACT

A partition for sealing and/or supporting a cavity includes a carrier and an expansion material on the carrier. The expansion material transitions from an initial state to an expanded state by activation. The carrier includes at least one compensation element that provides variability of an effective sealing surface of the carrier in case of a force acting on the carrier. The carrier also includes a limiting element that limits movement of at least one portion of the carrier that accompanies a change in the effective sealing surface of the carrier.

18 Claims, 4 Drawing Sheets

(56) References Cited

U.S. PATENT DOCUMENTS

| | | | |
|---|---|---|---|
| 7,140,668 B2 | 11/2006 | Wesch et al. | |
| 7,735,906 B2 * | 6/2010 | Takahashi | B62D 25/04 |
| | | | 296/187.02 |
| 8,356,859 B2 | 1/2013 | Shin et al. | |
| 10,960,934 B2 * | 3/2021 | Shantz | B62D 29/04 |
| 11,685,085 B2 * | 6/2023 | Richardson | B29C 44/188 |
| | | | 425/4 R |
| 11,883,995 B2 * | 1/2024 | Quaderer | B29C 48/12 |
| 11,970,215 B2 * | 4/2024 | Helfer | B62D 29/002 |
| 12,187,349 B2 * | 1/2025 | Kizler | B62D 25/00 |
| 2004/0046421 A1 * | 3/2004 | Barz | B62D 29/002 |
| | | | 296/187.02 |
| 2004/0239148 A1 | 12/2004 | Ratet | |
| 2008/0110694 A1 | 5/2008 | Niezur et al. | |
| 2008/0174134 A1 * | 7/2008 | Niezur | B60R 13/0206 |
| | | | 294/158 |
| 2013/0241226 A1 | 9/2013 | Shantz et al. | |
| 2017/0266855 A1 | 9/2017 | Deachin et al. | |
| 2020/0298910 A1 * | 9/2020 | Benouali | B62D 21/16 |
| 2021/0179191 A1 * | 6/2021 | Gasparri | B60R 13/083 |
| 2023/0202407 A1 * | 6/2023 | Kizler | B62D 25/00 |
| | | | 296/24.4 |
| 2025/0091531 A1 * | 3/2025 | Lindgren | B62D 29/002 |

FOREIGN PATENT DOCUMENTS

| | | |
|---|---|---|
| DE | 10240196 A1 | 3/2004 |
| EP | 1975006 B1 | 1/2012 |
| JP | H08510703 A | 11/1996 |
| JP | H0938981 A | 2/1997 |
| JP | 2010527304 A | 8/2010 |
| JP | 2011529818 A | 12/2011 |
| WO | 2008059012 A1 | 5/2008 |
| WO | 2010014681 A2 | 2/2010 |

\* cited by examiner

PARTITION

CROSS-REFERENCE TO RELATED APPLICATIONS

This application is a National Stage of International Patent Application No. PCT/EP2021/073629, filed Aug. 26, 2021, which claims foreign priority to European Patent Application No. 20193282.9, filed Aug. 28, 2020, the disclosures of which are hereby incorporated by reference in their entireties.

FIELD OF THE INVENTION

The invention relates to a partition for sealing and/or supporting a cavity, comprising a carrier and an expansion material arranged on the carrier, which expansion material can be transferred from an initial state to an expanded state by means of activation.

BACKGROUND

In the automotive sector, such partitions are used for acoustic and/or watertight sealing and partitioning and/or supporting of cavities in the bodywork. In this case, the partitions comprise a carrier which is peripherally equipped with an expansion material. The expansion material is characterized in that, in the installed state of the partition, it can be transferred by means of activation from an initial state to an expanded state, in which it acts as a sealing and/or supporting material between the carrier and adjacent components of the bodywork.

In view of the aim in the automotive industry of keeping the weight of vehicles as low as possible, thinner metal sheets are used in particular for the outer skin of the vehicles. This has the result that, by means of partitions of the type mentioned at the outset, which are installed between the outer skin and an internal component, for example another metal sheet, the outer skin can be visible to the outside in the form of inward indentations or bulges. The reason for this substantially lies in the behavior of the expansion material, which expands during the expansion process, for example by means of heat input, and comes to bear in a sealing and/or supporting manner on the surrounding components. After expansion, the expansion material cools down again and at least partially contracts. Depending on the materials used for the carrier and for the expansion material and on the quantity of the expansion material, outward bulging of the thin outer metal sheet can be caused by excessive expansion of the expansion material or the outer metal sheet can be caused to retract inward due to the contraction of the cooling expansion material. This constitutes a visual blemish.

In principle, it is possible to influence the expansion and deformation behavior and thus inward indentations or outward bulges by means of the selection of the material and the dimensional design of the components involved. A residual risk always remains as it is a complex system with numerous influencing variables. This situation appears in need of improvement.

The object of the present invention is therefore to provide a partition for sealing and/or supporting a cavity in the bodywork structure, which partition is easy to produce, offers very good sealing against noise and moisture in the installed state and by means of which a retraction or bulging of a component, in particular an outer metal sheet, adjoining the partition can be prevented.

SUMMARY OF THE INVENTION

This object is achieved by a partition having the features of claim 1.

Advantageous embodiments and developments of the invention are the subject matter of the dependent claims.

In order to achieve the object, it is proposed according to claim 1 that the carrier comprises at least one compensation element, which provides variability of the effective sealing surface of the carrier, such that a change in the effective sealing surface of the carrier can be brought about by means of a force acting on the carrier, a limiting element being provided, by means of which a movement of at least one portion of the carrier which accompanies the change in the effective sealing surface is limited.

The partition according to the invention is used for sealing a cavity and is used for this purpose in a surface that delimits the cavity. The surface delimiting the cavity that must be sealed is also referred to below as the delimitation surface. Both the carrier and the expansion material of the partition contribute to the sealing of the delimitation surface in the installed state of the partition. In the context of the invention, the effective sealing surface of the carrier is understood to mean a projection surface of the carrier which, in the installed state of the partition, lies in the plane of the delimitation surface or parallel thereto. Similarly, the effective sealing surface of the partition denotes the projection surface of the entire partition, which projection surface covers and effectively seals the entire delimitation surface in the installed state.

In principle, the invention also comprises partitions which do not have a primarily sealing effect but, for example, primarily have a supporting effect. Thus, areas of application are conceivable in which the requirements for an acoustic seal are low and the delimitation surface does not have to be covered in a corresponding manner over the entire surface area. Here, too, a partition according to the invention can be used, which then primarily has a supporting effect, but at the same time can have regions which are permeable to sound waves.

In other words, according to claim 1 of the invention, the carrier comprises a compensation element, by means of which the carrier can be designed such that the effective sealing surface of the carrier can change flexibly in response to a force acting on the carrier. A force effect on the carrier can thereby be caused in an installed state of the partition by the expansion behavior of the expansion material. When the expansion material arranged on the edge side of the carrier is activated, it initially expands or foams until it comes to rest against the components delimiting the cavity. Depending on the materials used and the amount of expansion material, the expansion effect can be so strong that a noticeable force acts on the surrounding components and on the carrier. In order to prevent the surrounding components from deflecting, for example outward bulging of an outer metal sheet, in response to this force, according to the invention the effective sealing surface of the carrier can change. For this purpose, the carrier has at least one compensation element, which provides variability of the effective sealing surface of the carrier and thus distance compensation is permitted. Significant expansion of the expansion material in the course of activation can thus cause the carrier to react with a change, in this case with a reduction in the size, of the effective sealing surface thereof, such that the overall area sealed by the expansion material and the carrier remains substantially constant and no bulges form on surrounding components.

Similarly, during the course of the cooling and the contraction of the expansion material, a force can act on the carrier and on surrounding components, which can cause an inward retraction. Here, too, the variability of the effective sealing surface of the carrier provided according to the invention counteracts the fact that the carrier increases the size of its effective sealing surface in response to the acting forces, such that the overall area sealed by the expansion material and the carrier remains substantially constant and does not result in retraction of surrounding components.

The compensation element, which provides the variability of the effective sealing surface of the carrier, can in each case be designed such that, in an installed state of the partition, the threshold value of the force at which a change in the effective sealing surface of the carrier occurs is lower than a threshold value from which deflection of surrounding components delimiting the cavity occurs. In other words, the compensation element can be designed to be easily movable.

In order to limit a movement of at least one portion of the carrier which accompanies the change in the effective sealing surface of the carrier, the invention provides a limiting element. This ensures that the carrier cannot yield to an arbitrary extent, and that the expansion material comes to rest against the components delimiting the cavity with sufficient contact pressure in spite of the carrier yielding in response to an acting force, such that a secure connection with a good sealing or supporting effect between the partition and the delimiting components is produced.

In the installed state, a partition designed to produce a sealing effect ensures very good sealing of the cavity with respect to heat, moisture and noise. Furthermore, dirt, dust or other types of particles cannot penetrate through the partition.

The compensation element can be implemented in the form of a spring element or a flexible component which, in the event of a force acting on the carrier, can cause expansion or shrinking of the effective sealing surface of the carrier. For example, a stationary portion and a movable portion of the carrier can be connected to one another via the compensation element in such a way that the movable portion is decoupled from the stationary portion by the compensation element. Thus, the movable portion can be moved within definable limits without the stationary portion moving. The compensation element is part of the carrier and preferably has the same sealing properties as the carrier.

According to one embodiment of the invention, the compensation element is designed as a bending element by means of which a bending angle is enclosed between two portions of the carrier. The bending element may be, for example, a bending point, a hinge, a spring element or a device similar thereto, which allows the carrier to perform a bending movement. The bending takes place here about a bending axis, which is preferably parallel to the delimitation surface. The bending angle enclosed between two portions of the carrier can be in a range of between 0° and 180°.

According to another embodiment of the invention, the compensation element is designed as a thin spot. A region of the carrier in which the carrier is thinner than in regions adjoining this region is defined as a thin spot. Such a region, designed for example in the manner of an integral hinge, has advantageous bending capabilities. The entire carrier including the thin spot may be manufactured from a single material, for example in an injection molding process.

The compensation element may be provided with advantageous temperature-dependent and time-dependent properties and may, for example, be designed such that it reacts quickly. Thus, the compensation element can very quickly bring about a change in the effective sealing surface of the carrier, which is caused by rapid foaming and/or contraction of the expansion material.

A force acting on the carrier that necessitates a change in the effective sealing surface of the carrier can have different causes. The force arises primarily due to the foaming and/or contraction of the expansion material. Furthermore, this force can arise due to temperature-related deformation of the carrier and/or of the surroundings or of the expansion material.

The carrier may primarily have the task of sealing the delimitation surface spanned by a cavity. The carrier preferably covers the majority of the delimitation surface. The remainder of the delimitation surface covers the expansion material.

The carrier may be manufactured from a material that has advantageous sealing properties. The material may be selected such that it features optimal sealing against water, oil and/or similar liquids. In addition, a light, stable and/or break-resistant material may be selected. The carrier can contribute to the structural stability of the overall object. Thus, the carrier can provide for more static and dynamic stability for use in cavities of an automobile. The carrier material can be selected such that it has advantageous material properties for the event that the cavity collapses, for example due to an accident. For example, the carrier material can be selected such that, in the event of destruction, a majority of the deformation energy is dissipated through the carrier. Thus, the material can be selected such that the carrier breaks up, for example into very fine individual parts, or is advantageously deformed in the event of destruction. The material is preferably selected such that damage in the cavity or adjacent regions, such as the cabin of an automobile, is prevented.

Furthermore, the carrier material can be selected such that natural vibration and/or structure-borne sound are minimized. This may be natural vibration of the carrier or of the entire system in which the cavity is formed. The carrier material may also have optimal soundproofing properties. The carrier material may have an insulating effect with respect to sound waves and electromagnetic waves. A polymer material, for example, may be used as the carrier material.

The expansion material itself is part of the partition. In this case, it can be that the carrier is provided peripherally with expansion material, for example by means of overmolding. The expansion material basically has two functions. Firstly, in the expanded state, it serves to secure the partition in a cavity, for example by means of gluing or clamping. Secondly, the expansion material is used together with the carrier to seal the delimitation surface of the cavity. In the expanded state, the expansion material fills the region formed between the carrier and the components delimiting the cavity. The expansion material may advantageously have adhering and/or adhesive properties. In addition, the expansion material may have resilient properties. At the same time, the expansion material may have optimal sealing properties with respect to moisture and noise that are adapted to the specific case.

The expansion material may, for example, be a material which foams during activation and solidifies in the foamed state. This may, for example, be a product from the product series known under the name Teroson®. The volume of the expanded expansion material may be approximately 10% to 3000% of the volume of the expansion material in the initial state. It is possible that the expansion material initially expands after activation and at least partially contracts again after reaching the maximum volume.

The activation of the expansion material may preferably take place by means of heat input. Alternatively, other forms of physical and/or chemical activation are also conceivable.

The limiting element provided according to the invention limits a movement of at least one portion of the carrier which accompanies the change in the effective sealing surface of the carrier. In other words, the carrier cannot yield arbitrarily in response to an acting force. In this way, it is ensured that the expansion material comes into contact with the components delimiting the cavity in any case with sufficient contact pressure, such that a secure connection with a good sealing effect between the partition and the delimiting components is produced.

According to one embodiment of the invention, the limiting element is arranged on a stationary portion of the carrier. A stationary portion is understood to mean a portion of the carrier which, in an installed state of the partition, substantially does not change its position during the change in the effective sealing surface of the carrier. In contrast, a movable portion of the carrier is understood to mean a portion which changes its position during the change in the effective sealing surface of the carrier in an installed state of the partition. In an alternative embodiment, the limiting element may also be arranged on a movable portion of the carrier. The limiting element acts in each case as a stop introduced into an intermediate space between a movable and a stationary portion in such a way that a movement of a movable portion relative to a stationary portion is limited to a small movement by the limiting element.

In an embodiment of the compensation element as a bending element with a bending angle enclosed between two portions of the carrier, the limiting element can be arranged on one of the two portions such that a movement of one portion relative to the second portion can only take place over a limited angular range of the bending angle. For example, the limiting element may be designed such that a movement of one portion relative to the other portion can only take place over an angular range of 0° to 20°, while larger angular movements are prevented by the limiting element. The limiting element may be designed to absorb shocks, such that the impact does not result in damage to the partition. Furthermore, the limiting element may have an abutment edge, which takes over the previously explained shock-absorbing function.

The limiting element may, in principle, have different cross-sections. For example, the limiting element may have a triangular or a trapezoidal cross-section.

According to one embodiment of the invention, the partition is equipped with at least one positioning aid, the positioning aid comprising a support rib which has a means for positioning the carrier. The positioning aid assists in exact positioning and support of the partition in a cavity and ensures that the partition remains in the desired orientation after being installed. The positioning aid may be designed such that a support surface of the positioning aid rests flush against a wall delimiting the cavity.

In summary, support and/or very good sealing of a cavity with respect to moisture and noise is possible with the described partition, the variability of the effective sealing surface of the carrier provided according to the invention resulting in a decoupling of tensile or compressive forces in such a way that, during activation of the expansion material, no forces or no significant forces act on adjacent components, and bulging and/or retraction of these components can be effectively prevented. As a result, there is more freedom in the selection of the material for the carrier material and the expansion material. On account of the limiting element provided according to the invention, sufficient tightness against moisture and sound in the connection region of the partition is additionally provided despite the yielding of the carrier.

BRIEF DESCRIPTION OF THE DRAWINGS

The invention is explained in more detail below with reference to exemplary embodiments and with reference to the accompanying drawings, in which.

Figure 1:
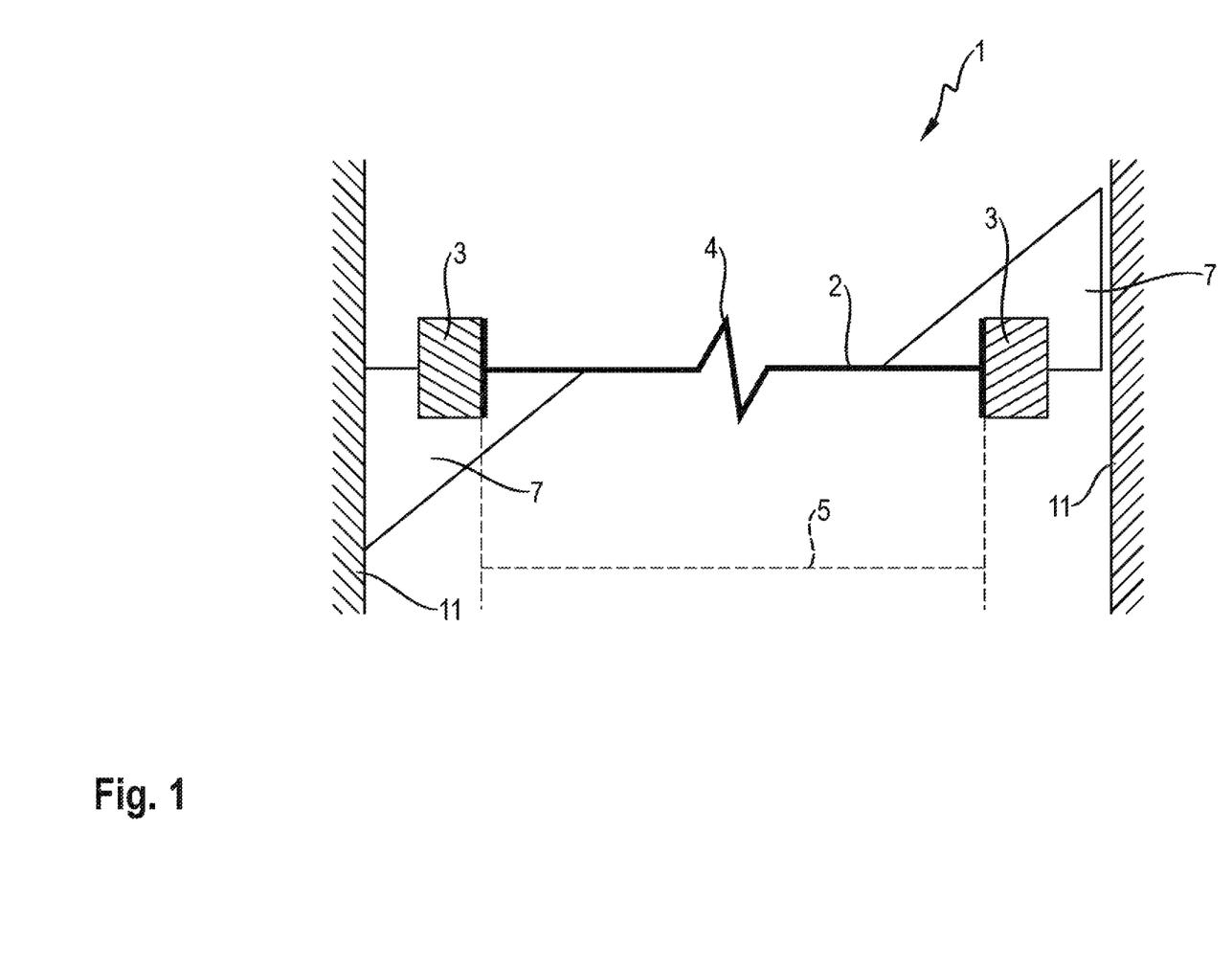
FIG. 1: shows an embodiment of the partition according to the invention in a sectional view.

FIG. 1 is a sectional view of an embodiment of a partition 1 which is positioned in a cavity between two metal sheets 11 of a bodywork. The partition 1 comprises a carrier 2 and expansion material 3 arranged on the edge of the carrier 2. In the view in FIG. 1, the expansion material 3 is in an initial state in which it has not yet foamed or expanded.

The carrier 2 further comprises a compensation element 4, which is designed as a spring element. The spring element allows for linear changes in the length of the carrier 2 along an axis extending on the carrier 2. As a result, the length of the carrier 2 along this axis and thus the effective sealing surface 5 of the carrier 2 can change in response to a force acting on the carrier 2. The effective sealing surface 5 of the carrier 2 is shown as a projection surface of the surface of the carrier 2 in FIG. 1.

A limiting element is not shown in FIG. 1 for reasons of clarity. Its function is explained in more detail below in conjunction with FIGS. 2 to 4.

The partition 1 is also equipped with two positioning aids 7. The positioning aids 7 are designed as support ribs, which are each arranged on the edges of the carrier 2. Here, the support ribs help to guide the edges of the carrier 2 equipped with expansion material 3 against the metal sheets 11. Each support rib has a support surface which is applied against the relevant metal sheet.

The cavity is sealed by means of the partition 1 as follows: The partition 1 is held in position in the cavity by the positioning aids 7. The expansion material 3 is then activated by heat input. When the expansion material 3 is activated, it initially expands or foams, and comes to rest against the metal sheets 11. If the expansion process persists, a force acts on the metal sheets 11 and on the carrier 2. In response to this acting force, the compensation element 4 designed as a spring element reacts and is compressed. As a result, the effective sealing surface 5 of the carrier 2 changes. In other words, distance compensation is produced by the carrier 2 such that an outward deflection or bulging of the metal sheets 11 can be prevented. Significant expansion of the expansion material 3 in the course of activation thus causes the carrier 2 to react with a reduction in the size of the effective sealing surface 5 thereof, such that the overall area sealed by the expansion material 3 and the carrier 2 remains substantially constant and no bulges form on the outer metal sheets 11.

DETAILED DESCRIPTION

Likewise, after activation during cooling of the expansion material, a retraction of the metal sheets 11 into the cavity can be prevented. The cooling expansion material 3 contracts at least partially again. This process also makes it possible to effect forces on the carrier 2 and on the metal sheets 11, which are now directed in the opposite direction. In response to these acting forces, the compensation element 4 is stretched, as a result of which the effective sealing surface 5 of the carrier 2 becomes larger. The overall area sealed by the expansion material 3 and the carrier 2 thus remains substantially constant in this case.

Figure 2:
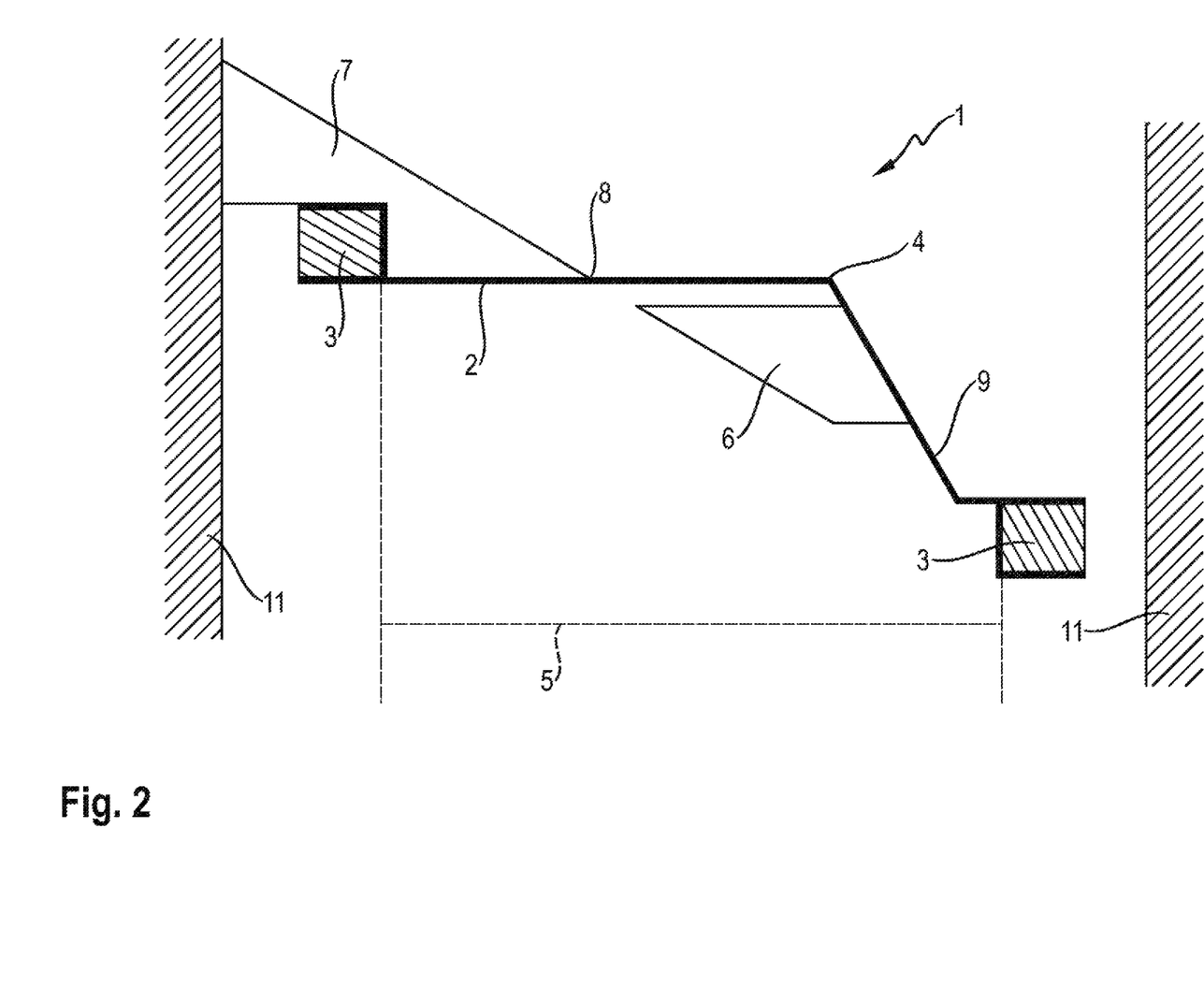
FIG. 2: shows another embodiment of the partition in a sectional view.

FIG. 2 shows an alternative embodiment of a partition 1. In this case, the carrier 2 is equipped with a compensation element 4 designed as an integral hinge, which is not shown in more detail in the representation in the figure. In an installed state of the partition 1, a movable portion 9 is movable relative to a stationary portion 8 of the carrier 2 on account of the integral hinge. In the state shown in FIG. 2, the portions 8 and 9 enclose a bending angle of approximately 120° with respect to one another. In response to a force acting on the carrier 2 due to the expansion behavior of the expansion material 3, the movable portion 9 can pivot relative to the stationary portion 8 such that the enclosed bending angle increases or decreases. When the bending angle is reduced, a limiting element 6 arranged on the movable portion 9 limits the pivoting movement of the portion 9 to a small angular range. A pivoting of the portion 9 away from the right-hand metal sheet 11 very soon leads to the limiting element 6 stopping against the stationary portion 8. As a result, it is ensured that the movable portion 9 cannot deflect arbitrarily in response to an acting force and that the expansion material 3 comes to rest against the metal sheet 11 with sufficient contact pressure despite the yielding of the portion 9, and therefore a secure connection with a good sealing effect between the partition 1 and the metal sheet 11 is produced. The pivoting of the movable portion 9 relative to the stationary portion 8 is accompanied by a change in the effective sealing surface 5 of the carrier 2.

Figure 3:
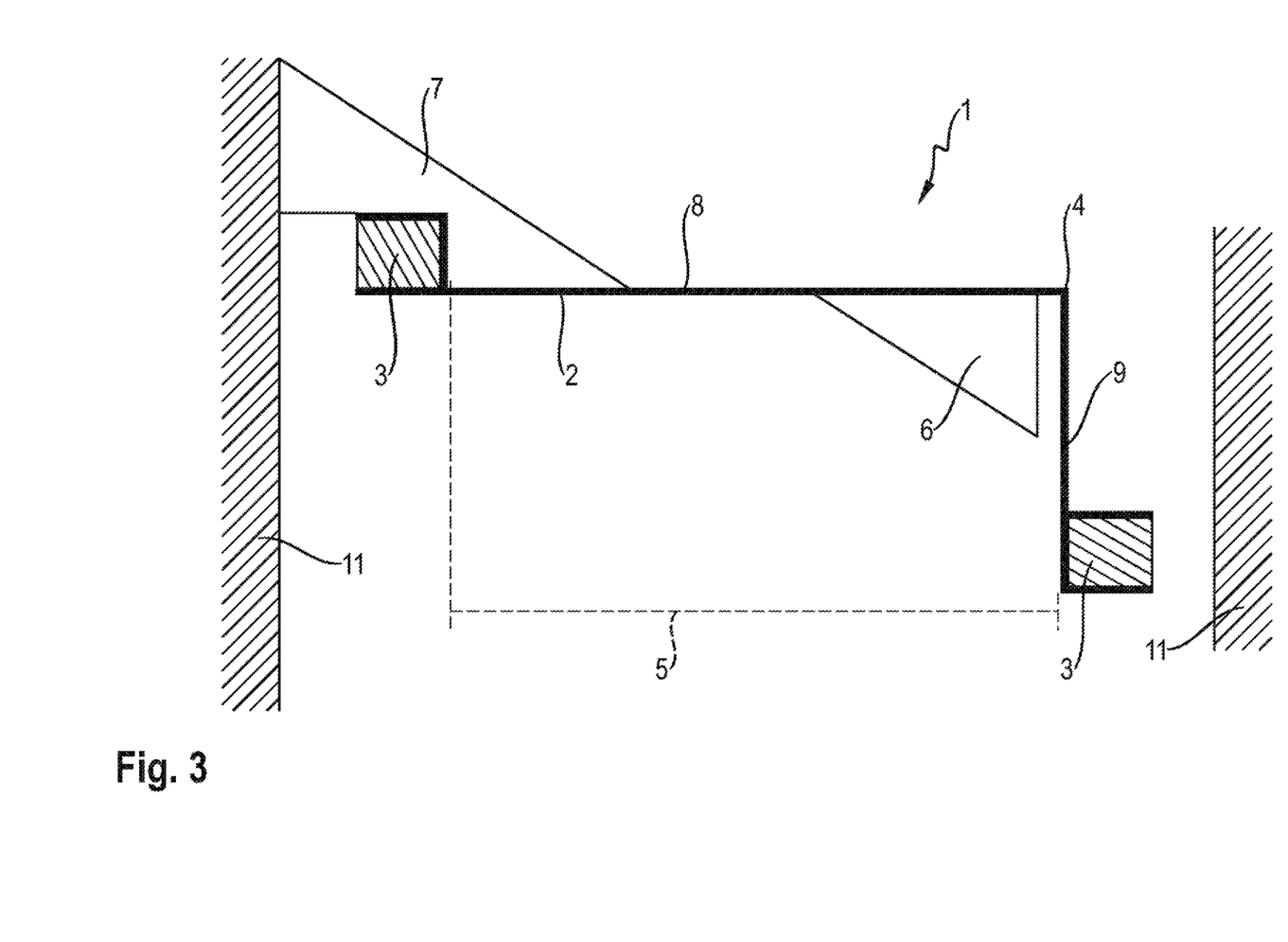
FIG. 3: shows another embodiment of the partition in a sectional view.

FIG. 3 shows another embodiment of the partition 1 having a compensation element 4 designed as an integral hinge. The mode of operation corresponds in principle to that described in connection with FIG. 2. In the initial state shown here, a bending angle of approximately 90° is enclosed between the stationary portion 8 and the movable portion 9 of the carrier 2. In this embodiment variant, a limiting element 6 is arranged on the stationary portion 8 of the carrier 2. Accordingly, a pivoting movement of the movable portion 9 from the right-hand metal sheet 11 can take place only up to the stop of the portion 9 on the limiting element 6 and is thus limited to defined angular ranges. By pivoting the movable portion 9 relative to the stationary portion 8 in response to an acting force, the effective sealing surface 5 of the carrier 2 changes.

Figure 4:
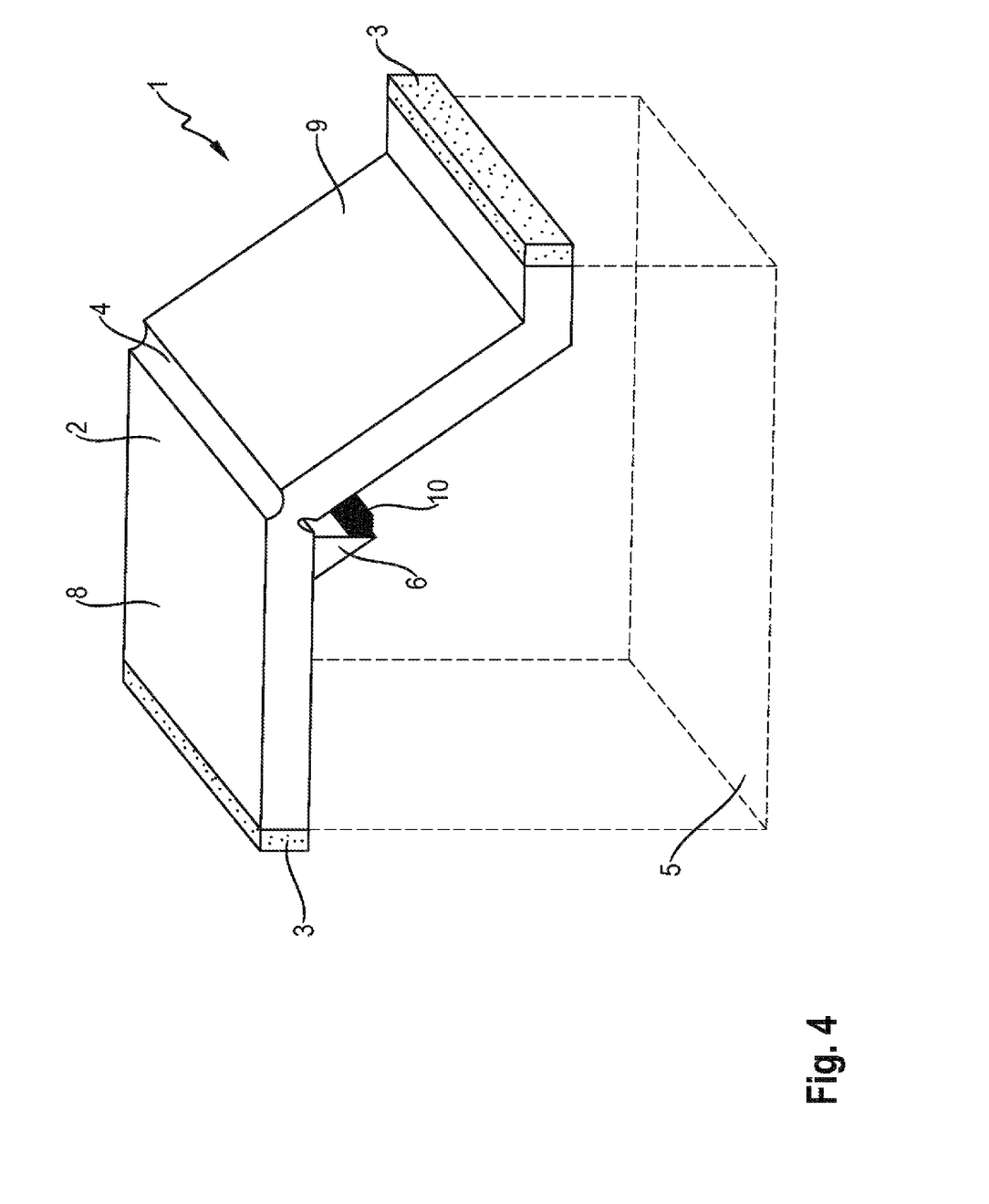
FIG. 4: shows another embodiment of the partition in a perspective view.

FIG. 4 shows a detail of another embodiment of the partition 1 in a perspective view. Here, too, the partition 1 is equipped with a compensation element 4 designed as an integral hinge. The thin spot forming the integral hinge can be clearly seen in this view. Bending of the carrier 2 in the region of the thin spot is limited by the limiting element 6, which is arranged here on a stationary portion 8 of the carrier 2. The limiting element 6 comprises an abutment edge 10, which can be designed to absorb shocks, such that no damage to the carrier 2 arises due to the impact. The significance of the effective sealing surface 5 as a projection surface of the carrier 2 is further clearly apparent from FIG. 4.

LIST OF REFERENCE SIGNS

1 Partition
2 Carrier
3 Expansion material
4 Compensation element
5 Effective sealing surface
6 Limiting element
7 Positioning aid
8 Stationary portion
9 Movable portion
10 Abutment edge
11 Metal sheet

The invention claimed is:

1. A partition for sealing and/or supporting a cavity, the partition comprising:
   a carrier comprising a stationary portion and a movable portion that is configured to move relative to the stationary portion; and
   an expansion material on the carrier, wherein the expansion material is configured to expand from an initial state to an expanded state by activation,
   wherein the carrier comprises at least one compensation element, between the stationary portion and the movable portion, the at least one compensation element configured to bend to provide variability of an effective sealing surface of the carrier when a force due to the expansion of the expansion material is acting on the carrier, and
   wherein the carrier further comprises a limiting element on the carrier and that is configured to limit bending of the at least one compensation element to limit the change in the effective sealing surface of the carrier.

2. The partition of claim 1, wherein the compensation element defines a bending angle between the stationary portion and the movable portion.

3. The partition of claim 1, wherein the compensation element is a thin spot.

4. The partition of claim 1, wherein the limiting element is arranged on the stationary portion.

5. The partition of claim 1, wherein the limiting element is arranged on the movable portion.

6. The partition of claim 1, further comprising at least one positioning aid comprising a support rib that is configured to position the carrier.

7. The partition of claim 1, wherein the limiting element comprises an abutment edge configured to absorb shocks.

8. The partition of claim 1, wherein the limiting element extends transversely from the stationary portion or the movable portion of the carrier.

9. The partition of claim 1, wherein the limiting element has a triangular or a trapezoidal cross-section.

10. The partition of claim 2, wherein the limiting element is positioned on the side of the carrier on which the bending angle is defined.

11. The partition of claim 2, wherein the limiting element is configured to limit the change in the bending angle between the stationary portion and the movable portion to an angular range of from 0° to 20°.

12. The partition of claim 2, wherein the bending angle between the stationary portion and the movable portion is about 120°.

13. The partition of claim 2, wherein the bending angle between the stationary portion and the movable portion is about 90°.

14. The partition of claim 4, wherein the stationary portion does not change position during the expansion of the expansion material.

15. The partition of claim 1, wherein the activation is heat activation.

16. The partition of claim 1, wherein the activation is physical activation or chemical activation.

17. The partition of claim 1, wherein the expansion material is configured to foam during the activation and is solid in the expanded state.

18. The partition of claim 1, wherein the volume of the expansion material in the expanded state is up to 3000% of the volume of the expansion material in the initial state.

* * * * *